US012806822B2

(12) United States Patent
Surace et al.

(10) Patent No.: US 12,806,822 B2
(45) Date of Patent: Nov. 24, 2026

(54) FIXTURE WITH GROOVES FOR PROCESSING CMC ARTICLE

(71) Applicant: RAYTHEON TECHNOLOGIES CORPORATION, Farmington, CT (US)

(72) Inventors: Raymond Surace, Newington, CT (US); Jun Nable, Hamden, CT (US); Kathryn S. Read, Marlborough, CT (US); Ying She, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 49 days.

(21) Appl. No.: 18/070,962

(22) Filed: Nov. 29, 2022

(65) Prior Publication Data

US 2024/0173890 A1 May 30, 2024

(51) Int. Cl.
*B29C 64/00* (2017.01)
*B28B 11/00* (2006.01)

(52) U.S. Cl.
CPC .................................. *B28B 11/003* (2013.01)

(58) Field of Classification Search
CPC ..................................................... B28B 11/003
See application file for complete search history.

(56) References Cited

U.S. PATENT DOCUMENTS 3,895,084 A 7/1975 Bauer
RE34,825 E 1/1995 Warren
9,574,592 B2 2/2017 Hand et al.
10,392,696 B2 8/2019 Bertrand et al.
10,906,842 B2 2/2021 Shi et al.
11,046,620 B2 6/2021 Shim et al.
11,255,206 B2 2/2022 Overholser
2005/0253293 A1 * 11/2005 Cathcart ................. B29C 33/10 249/141
2015/0218693 A1 8/2015 Bertrand et al.
2023/0399268 A1 * 12/2023 Goujard ................ C04B 35/571

FOREIGN PATENT DOCUMENTS

| | | |
|---|---|---|
| CN | 214218854 | 9/2021 |
| FR | 3107283 | 8/2021 |
| WO | 2020030875 | 2/2020 |

OTHER PUBLICATIONS

European Search Report for European Patent Application No. 23212319.0 mailed Apr. 23, 2024.

* cited by examiner

*Primary Examiner* — Nicholas Krasnow

(74) *Attorney, Agent, or Firm* — Carlson, Gaskey & Olds, P.C.

(57) ABSTRACT

A fixture for processing a ceramic matrix composite article includes first and second tool segments that each have an exterior side and an interior side. The tool segments define there between a working region for holding a fiber preform that is to be densified with a ceramic material. Each of the interior sides has grooves there along for delivering a precursor gas to the working region.

16 Claims, 3 Drawing Sheets

FIXTURE WITH GROOVES FOR PROCESSING CMC ARTICLE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A fixture for processing a ceramic matrix composite article according to an example of the present disclosure includes first and second tool segments that each have an exterior side and an interior side. The first and second tool segments define there between a working region for holding a fiber preform that is to be densified with a ceramic material. Each of the interior sides has grooves for delivering a precursor gas to the working region.

In a further embodiment of any of the foregoing embodiments, the first and second tool segments include graphite.

In a further embodiment of any of the foregoing embodiments, the grooves are elongated along the interior side.

In a further embodiment of any of the foregoing embodiments, the interior side has a projected surface area in the working region, and the grooves are 33% to 66% of the projected surface area.

In a further embodiment of any of the foregoing embodiments, the first and second tool segments have having an array of through-holes connecting the exterior side and the interior side.

In a further embodiment of any of the foregoing embodiments, at least a portion of the through-holes intersect the grooves.

In a further embodiment of any of the foregoing embodiments, at least a portion of the through-holes are non-intersecting with the grooves.

In a further embodiment of any of the foregoing embodiments, the grooves are intersecting.

In a further embodiment of any of the foregoing embodiments, the grooves are non-intersecting.

In a further embodiment of any of the foregoing embodiments, the grooves have at least one inlet and at least one outlet that open to the exterior side.

A system for processing a ceramic matrix composite article according to an example of the present disclosure includes at least one fixture that has first and second tool segments that each have an exterior side and an interior side. The first and second tool segments define there between a working region for holding a fiber preform that is to be densified with a ceramic material. Each of the interior sides has grooves that have at least one inlet and at least one outlet that open to the exterior side. There is a source for providing a precursor gas, and a plenum connected to the source and the at least one inlet for providing the precursor gas to the working region via the grooves.

In a further embodiment of any of the foregoing embodiments, the at least one fixture includes multiple fixtures.

In a further embodiment of any of the foregoing embodiments, the grooves are elongated along the interior side, the interior side has a projected surface area in the working region, and the grooves are 33% to 66% of the projected surface area.

In a further embodiment of any of the foregoing embodiments, the first and second tool segments each have an array of through-holes that connect the exterior side and the interior side.

In a further embodiment of any of the foregoing embodiments, at least a portion of the through-holes intersect the grooves.

In a further embodiment of any of the foregoing embodiments, at least a portion of the through-holes are non-intersecting with the grooves.

In a further embodiment of any of the foregoing embodiments, the grooves are intersecting.

In a further embodiment of any of the foregoing embodiments, the grooves are non-intersecting.

In a further embodiment of any of the foregoing embodiments, the grooves have at least one inlet and at least one outlet that open to the exterior side.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Ceramic matrix composite (CMC) articles, such as but not limited to turbine blades, turbine vanes, blade outer air seals, and combustor panels may be fabricated via chemical vapor infiltration of a precursor gas into a fiber preform to deposit ceramic material on the fibers of the preform. In instances where the fiber preform is not self-supporting, a fixture may be used to support the preform in the desired geometry during processing. The fixture hinders flow of precursor gas to some regions of the fiber preform while permitting more flow to other regions, thereby contributing to uneven build-up of the ceramic material and concomitant lower performance of the article. Additionally, multiple fiber preforms may be processed simultaneously in a chamber through which the precursor gas flows. The flow may vary by spatial location in the chamber, thereby further contributing to uneven build-ups between articles that receive more or less flow. In these regards, as will be described below, the disclosed fixture facilitates improved flow of precursor gas into a fiber preform.

Figure 1:
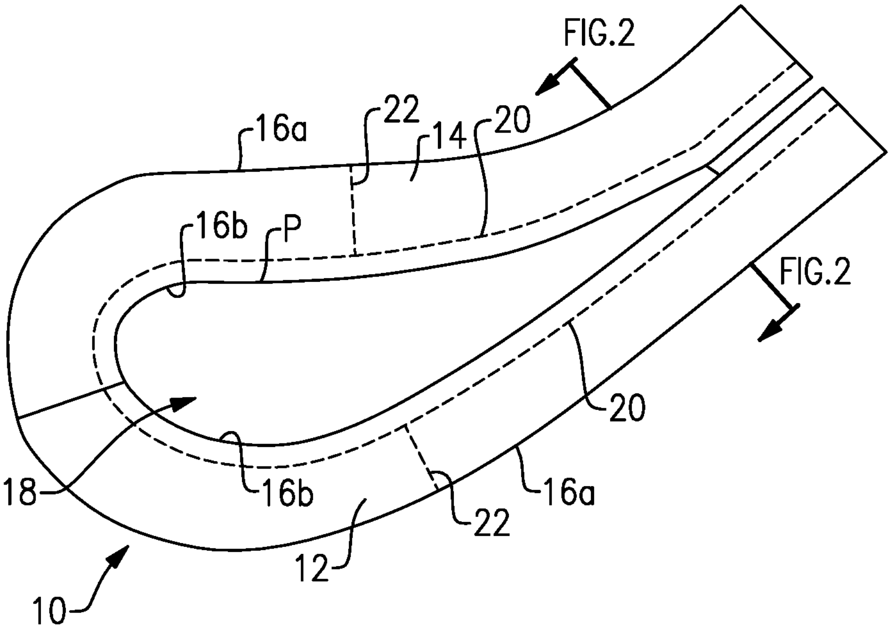
FIG. 1 illustrates a fixture for processing a ceramic matrix composite article.
Figure 2:
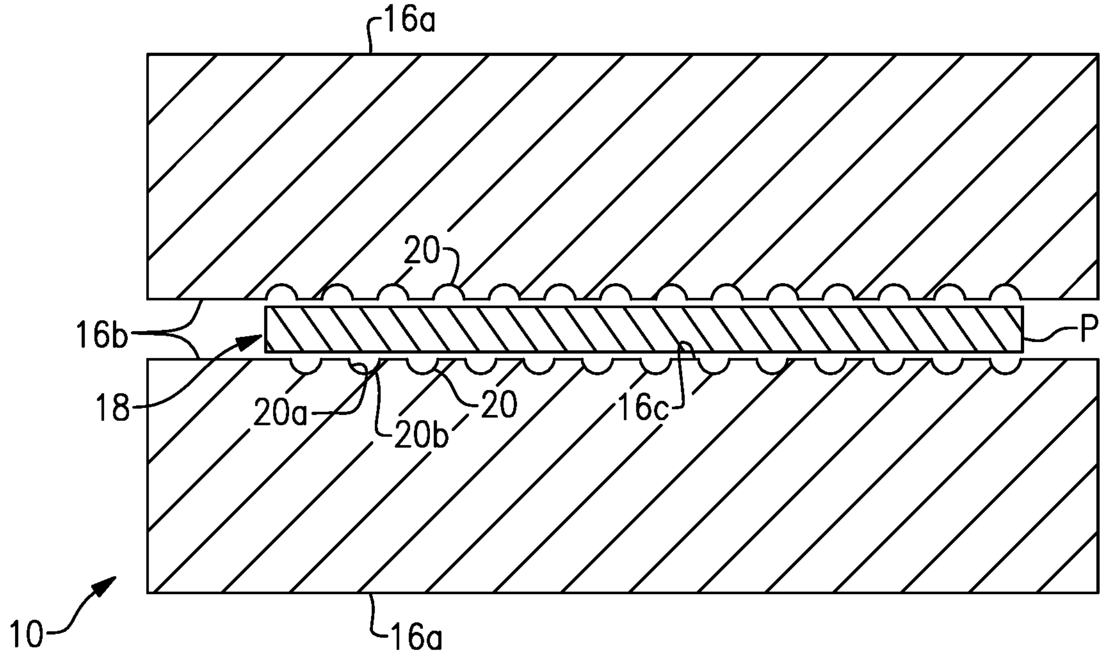
FIG. 2 illustrates a sectioned view of the fixture.

FIG. 1 illustrates an example fixture 10 that is holding a fiber preform P, and FIG. 2 illustrates a sectioned view through the fixture 10 and fiber preform P. The fixture 10 is depicted with an airfoil geometry, but it is to be understood that the geometry will be adapted to the geometry of the end-use article that is to be produced. The fixture 10 includes first and second tool segments 12/14, but the fixture 10 could be further segmented such that it has three, four, or more segments. In general, the segments 12/14 are made of materials that are inert with respect to the precursor gas used in the processing, have a maximum use temperature that exceeds the temperature at which the processing is to be conducted, and are of sufficient strength to resist breaking during processing and handling. For instance, the material may be, but is not limited to, graphite (e.g., monolithic graphite or carbon graphite composites such as C-fiber/C-matrix composites).

Each of the tool segments 12/14 has an exterior side 16*a* and an interior side 16*b*. The interior sides 16*b* are contoured for the article geometry, such as with a cavity in the shape of an airfoil. The interior sides 16*b* face each other to define a working region 18 where the fiber preform P is held. The terms "interior" and "exterior" are relative to the working region 18 in that the exterior side 16*a* generally faces away from the working region 18 and the interior side 16*b* generally faces toward the working region 18.

The fiber preform P is comprised of ceramic fibers arranged in a fiber architecture. The ceramic fibers are formed of bundles of filaments and may include, but are not limited to, silicon carbide (SiC) fibers, carbon (C) fibers or silicon nitride (Si3N4) fibers. For instance, the preform P may include multiple fiber layers or plies that are laid-up to form the geometry of the end-use article, or a portion thereof. In some instances, the fiber layers or plies are laid-up around one or more mandrels, which may remain in the preform P through a portion of the processing and then be removed later on to leave one or more internal cavities in the end-use article. In general, however, the preform P is initially devoid of any ceramic coating or matrix material.

The interior sides 16*b* of the tool segments 12/14 have elongated grooves 20 there along. Each groove 20 includes groove sides 20*a* and a bottom 20*b*. In the example in FIG. 2, the cross-sections of the grooves 20 are sectors of a circle (e.g., a semi-circle), but they could alternatively be sectors of an ellipsoid, stadium, or polygon.

The grooves 20 serve as passages for delivering the precursor gas to the working region 18 to densify (at least partially) the fiber preform P. The precursor gas may be for deposition of an interface coating material (e.g., boron nitride or silicon carbide) on the fibers or for a matrix material (e.g., silicon carbide). Although deep, wide grooves 20 may be desirable for enhancing flow of the precursor gas, the number, size, and pitch of the grooves 20 is balanced against other factors, such as fixture strength and support of the fiber preform P. For example, relatively large grooves may weaken the fixture by thinning the fixture walls. The grooves 20 are thus made to be relatively small in order to maintain good fixture strength. For example, the grooves 20 have a maximum depth and a maximum width of 0.050 inches to 0.200 inches to achieve good strength.

Land surfaces 16*c* between the grooves 20 serve as support surfaces for the fiber preform P and thus facilitate maintaining the design profile of the fiber preform P. For example, if the area of the land surfaces 16*c* is relatively small, the fiber preform P may be insufficiently supported and may deform and "drape" into the grooves 20. The fixture 10 thus provides plenty of land surface 16*c* in order to support and maintain the shape of the preform. For example, the interior side 16*b* has a projected surface area in the working region 18, and the grooves 20 are 33% to 66% of the projected surface area to achieve good support (the land surfaces 16*c* make up the remainder of the area). The "projected surface area" as used herein refers to the 2D area taken in a direction normal to the plane of the land surfaces 16*c*.

Figure 3:
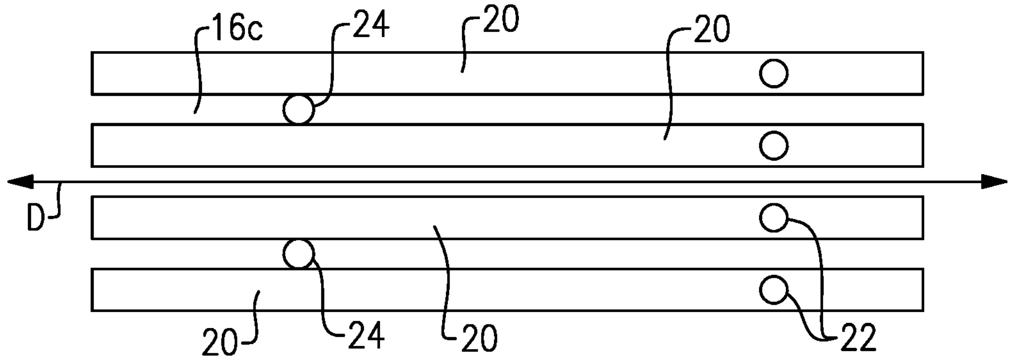
FIG. 3 illustrates a non-intersecting groove configuration.

The grooves 20 may also be provided in a configuration that further facilitates supporting the fiber preform P and distributing the precursor gas. For example, FIG. 3 depicts the grooves 20 in a non-intersecting configuration in which the grooves 20 are substantially parallel to each other. The orientation of the grooves 20 may be tailored to the fiber architecture of the fiber preform P. For instance, the elongated direction of the grooves 20 is oriented with respect to a fiber direction D defined by the fiber in the preform P. The fiber direction D may be a direction that is oblique to a primary fiber direction along which fibers are oriented such that the fibers bridge across the grooves 20. Such a configuration facilitates preventing the fibers from draping into the grooves 20, to maintain the shape of the preform P.

The tool segments 12/14 may also have through holes 22 (see also FIG. 1) to aid in transport of the precursor gas. The through-holes 22 connect the exterior and interior sides 16*a*/16*b*. The through-holes 22 may intersect the grooves 20 (FIG. 3). In that case, the through-holes 22 may cooperate with the grooves 20 to transport the gas. For example, if the precursor gas is provided at the exterior of the fixture 10, the gas can flow through the through-holes 22 into the grooves 20 for distribution to the working region 18. Alternatively, the through-holes can serve as vent holes for egress of precursor gas from the grooves 20 if the process initially provides the precursor gas directly into the grooves 20. Additionally or alternatively, the fixture 10 may have through-holes 24 that are non-intersecting with the grooves 20. In that case, the through-holes 24 intersect the land surfaces 16*c* and can deliver precursor gas from the exterior side 16*a* directly to the working region 18, or vent precursor gas from the working region 18.

Figure 4:
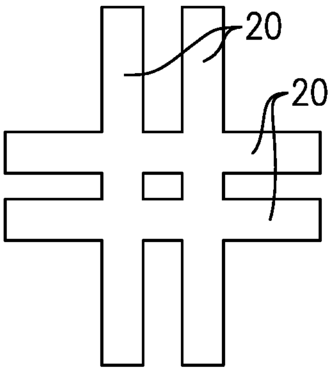
FIG. 4 illustrates a perpendicular intersecting groove configuration.
Figure 5:
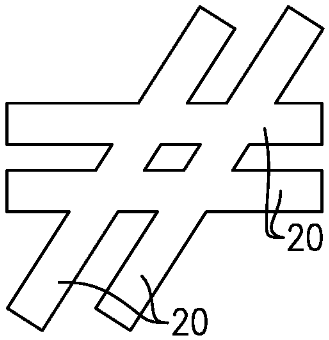
FIG. 5 illustrates an oblique intersecting groove configuration.

FIGS. 4 and 5 illustrate examples in which the grooves 20 have intersecting configurations. In FIG. 4 the grooves 20 have a substantially perpendicular orientation, and in FIG. 5 the grooves 20 have an oblique orientation. In these examples, the grooves 20 form an interconnected network in which the precursor gas can flow among the grooves 20 for distribution into the fiber preform P. Both of these examples may also include through-holes 22 and/or 24. In the examples above, the grooves 20 are substantially straight, but in further examples the grooves 20 may be curved or may wind back-and-forth in a serpentine configuration.

Figure 6:
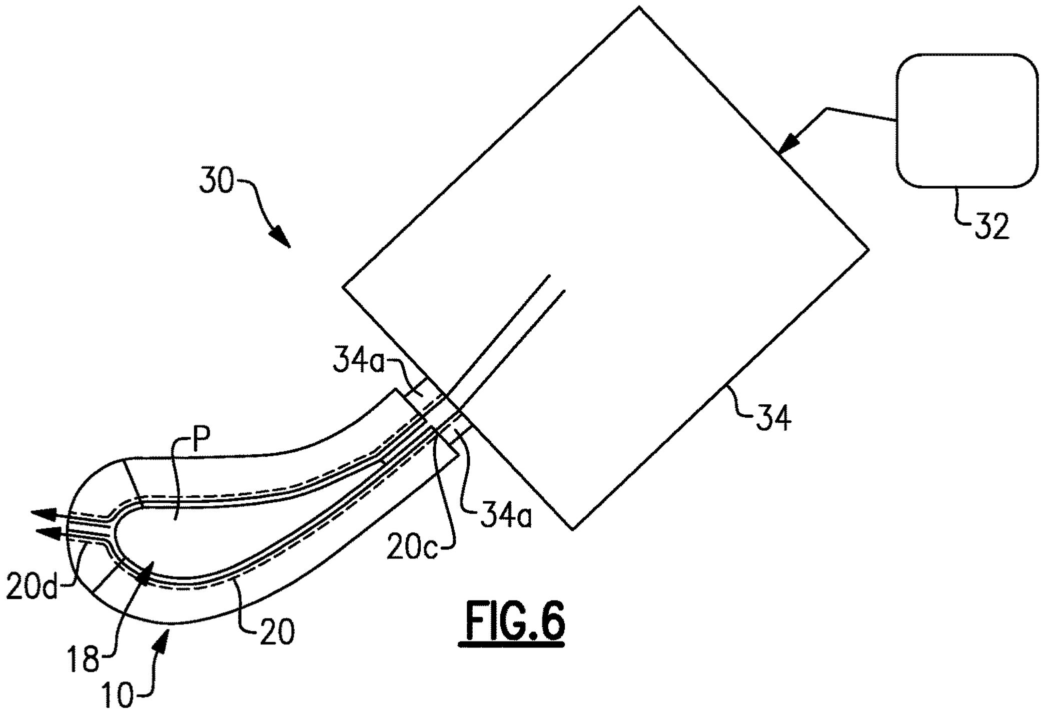
FIG. 6 illustrates a system for processing a ceramic matrix composite article.
Figure 7:
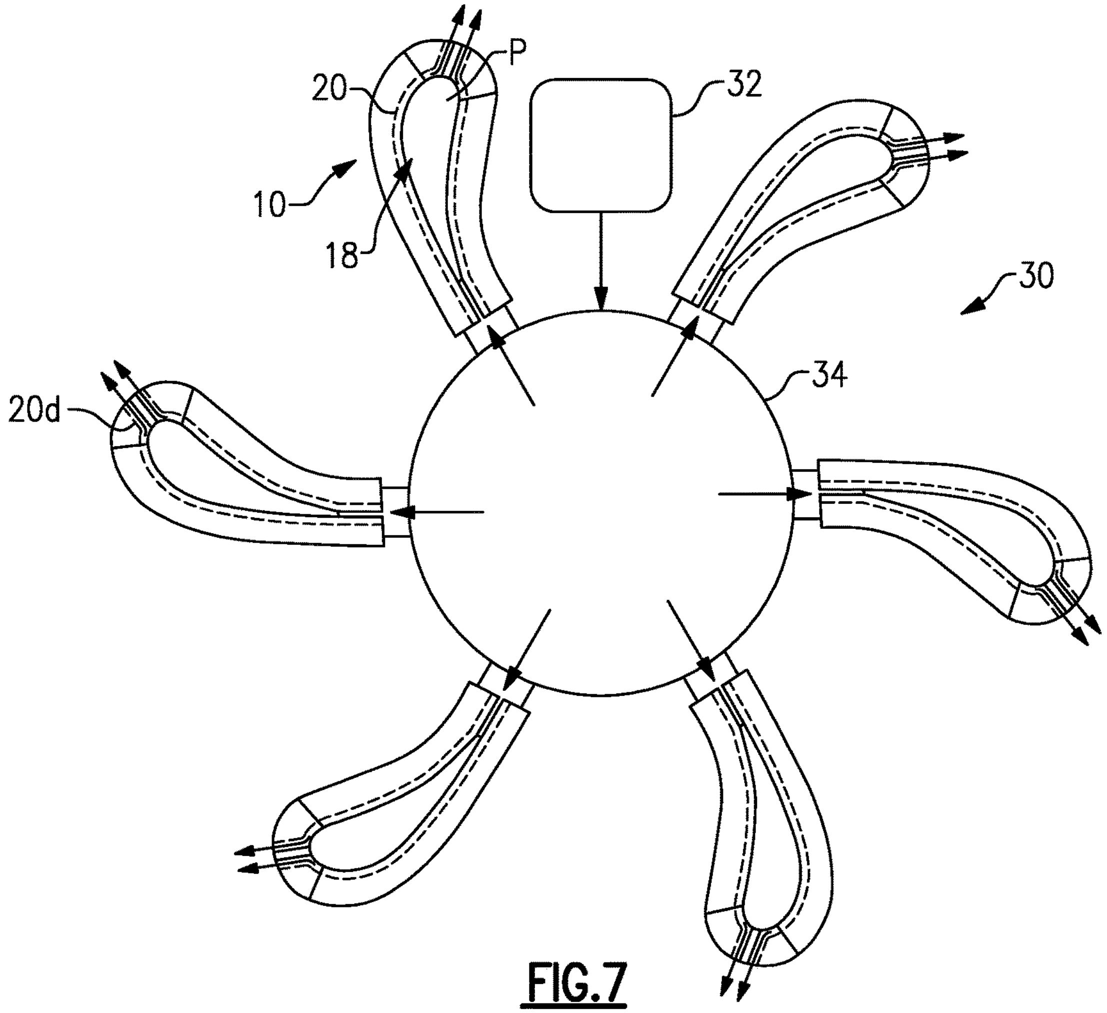
FIG. 7 illustrates a system for processing multiple ceramic matrix composite articles.

FIG. 6 illustrates a system 30 for processing a ceramic matrix composite article using the fixture 10. The system 30 includes at least one fixture 10, a source 32 for providing the precursor gas, and a plenum 34 connected to the source 32. The source 32 may be in the plenum 34 or integrated there with. The plenum 34 has one or more outlets 34*a* that connect to an inlet or inlets 20*c* of the grooves 20. During processing, pressurized precursor gas is provided from the source 32 into the plenum 34. The plenum 34 delivers the pressurized gas through the outlet 34*a* to the inlet 20*c* of the grooves 20, which distribute the gas to the working region 18 for infiltration into the fiber preform P. The grooves 20 also have one or more outlets 20*d* for exhausting spent precursor gas from the fixture 10. The system 30 thus forces flow of the precursor gas directly into the grooves 20 for forced convection infiltration into the fiber preform P to thereby facilitate efficient feed of gas to the preform. FIG. 7 illustrates another example of the system 30 in which the plenum 34 is connected to multiple fixtures 10 to enable simultaneous processing of multiple fiber preforms.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A fixture for processing a ceramic matrix composite article, the fixture comprising:

first and second tool segments each having an exterior side and an interior side, the first and second tool segments defining there between a working region for holding a fiber preform that is to be densified with a ceramic material, each of the interior sides having grooves there along for delivering a precursor gas to the working region, the first and second tool segments having an array of through-holes connecting the exterior side and the interior side, at least a portion of the through-holes intersecting the grooves, and wherein the grooves are intersecting each other at multiple intersection locations to form an interconnected gas flow network and the first and second tool segments include graphite.

2. The fixture as recited in claim 1, wherein the grooves are elongated along the interior side.

3. The fixture as recited in claim 1, wherein the interior side has a projected surface area in the working region, and the grooves are 33% to 66% of the projected surface area.

4. The fixture as recited in claim 1, wherein at least a portion of the through-holes are non-intersecting with the grooves.

5. The fixture as recited in claim 1, wherein the grooves have at least one inlet and at least one outlet that open to the exterior side.

6. A system for processing a ceramic matrix composite article, the system comprising:

at least one fixture including first and second tool segments each having an exterior side and an interior side, the first and second tool segments defining there between a working region for holding a fiber preform that is to be densified with a ceramic material, each of the interior sides having grooves there along, the grooves have at least one inlet and at least one outlet that open to the exterior side, the first and second tool segments having an array of through-holes connecting the exterior side and the interior side, at least a portion of the through-holes intersecting the grooves, and wherein the grooves are intersecting each other at multiple intersection locations to form an interconnected gas flow network the first and second tool segments include graphite;

a source for providing a precursor gas; and a plenum connected to the source and the at least one inlet for providing the precursor gas to the working region via the grooves.

7. The system as recited in claim 6, wherein the at least one fixture includes multiple fixtures.

8. The fixture as recited in claim 1, wherein the grooves are elongated along the interior side, the interior side has a projected surface area in the working region, and the grooves are 33% to 66% of the projected surface area.

9. The system as recited in claim 6, wherein the first and second tool segments each have an array of through-holes that connect the exterior side and the interior side.

10. The system as recited in claim 9, wherein at least a portion of the through-holes intersect the grooves.

11. The system as recited in claim 9, wherein at least a portion of the through-holes are non-intersecting with the grooves.

12. The system as recited in claim 6, wherein the grooves are intersecting.

13. The system as recited in claim 6, wherein the grooves are non-intersecting.

14. The system as recited in claim 6, wherein the grooves have at least one inlet and at least one outlet that open to the exterior side.

15. The fixture as recited in claim 1, wherein the grooves perpendicularly intersect each other.

16. The fixture as recited in claim 1, wherein the grooves obliquely intersect each other.

* * * * *